United States Patent [19]

Murphy

[11] 4,110,981

[45] Sep. 5, 1978

[54] HYDRAULIC MOTOR WITH AIR DISTRIBUTOR-OPERATED VALVES

[76] Inventor: John R. Murphy, Hwy. 278 East, Amory, Miss. 38821

[21] Appl. No.: 825,462

[22] Filed: Aug. 17, 1977

[51] Int. Cl.² .............................................. F15B 11/20
[52] U.S. Cl. ........................................ 60/371; 60/415; 180/66 R
[58] Field of Search ................. 60/369, 370, 371, 413, 60/415, 418; 91/4 R, 5, 340; 180/44 F, 66 R, 66 B

[56] References Cited

U.S. PATENT DOCUMENTS

| 2,915,042 | 12/1959 | Shafer | 91/4 R X |
|---|---|---|---|
| 3,024,809 | 3/1962 | Shafer | 91/4 R X |
| 3,507,189 | 4/1970 | Beckett et al. | 91/4 R |
| 3,765,180 | 10/1973 | Brown | 91/4 R X |
| 3,779,132 | 12/1973 | Otto | 91/350 X |
| 4,018,050 | 4/1977 | Murphy | 60/370 |

*Primary Examiner*—Edgar W. Geoghegan
*Attorney, Agent, or Firm*—Browdy and Neimark

[57] ABSTRACT

An oil-operated motor driven from an air-pressurized oil supply tank. The motor has sets of opposing cylinders having oil admission valves and containing drive pistons connected to a crankshaft. The cylinders are connected to the pressurized supply tank through the admission valves and respective ones of a pair of compressed air-controlled pilot valves. The pilot valves are controlled by relay valves alternately opened by a rotating cam driven by the crankshaft. The pilot valves control the delivery of pressurized oil to cylinders arranged to be alternately supplied with pressurized oil, with their pistons acting to drive the crankshaft in a common direction by alternate power pulsations. A common compressed air supply is employed to pressurize the oil reservoir and to operate the pilot valves. The exhaust oil from the motor is returned to the oil reservoir by a hydraulic pump driven by the main oil-operated motor.

14 Claims, 6 Drawing Figures

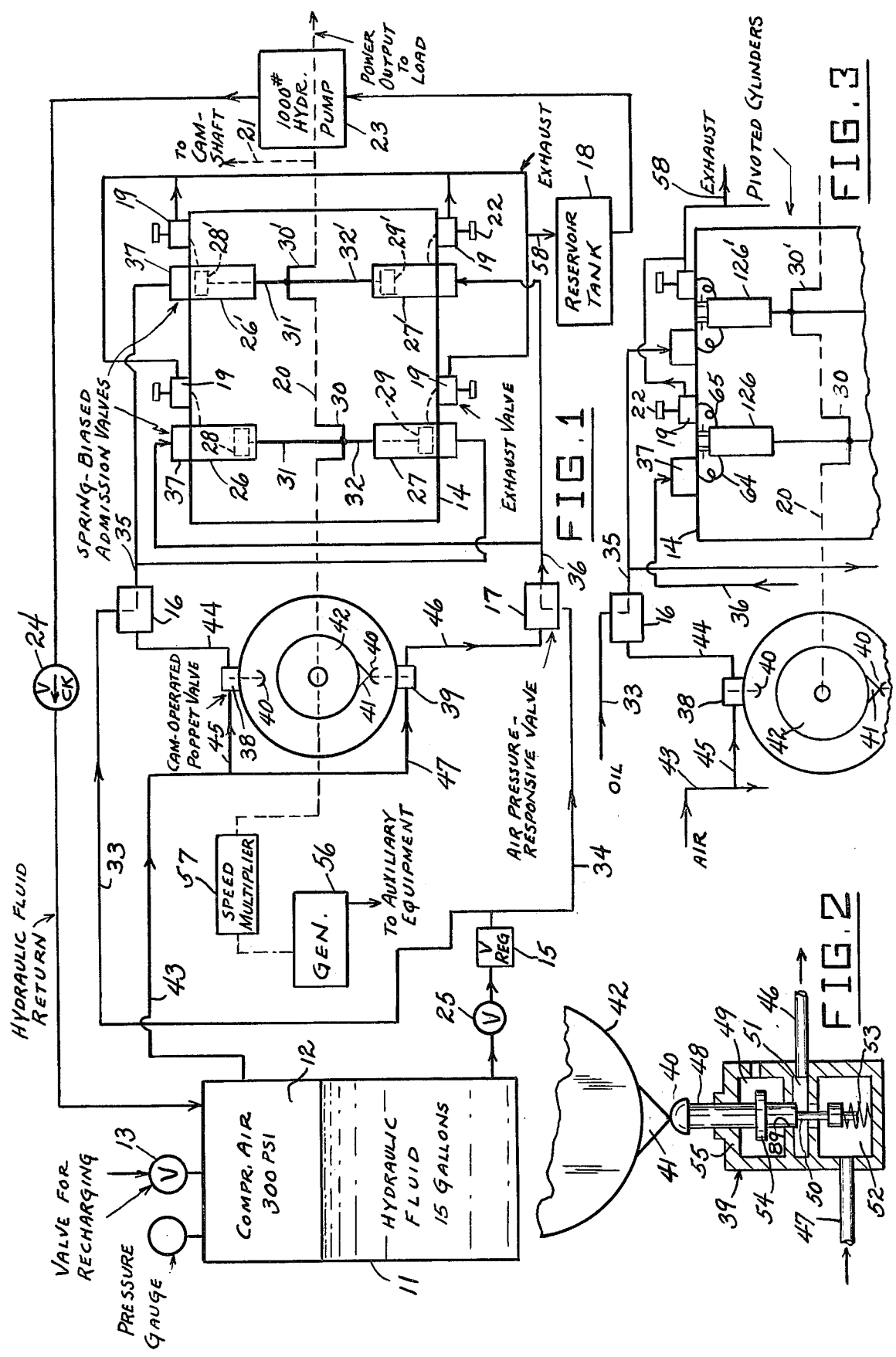

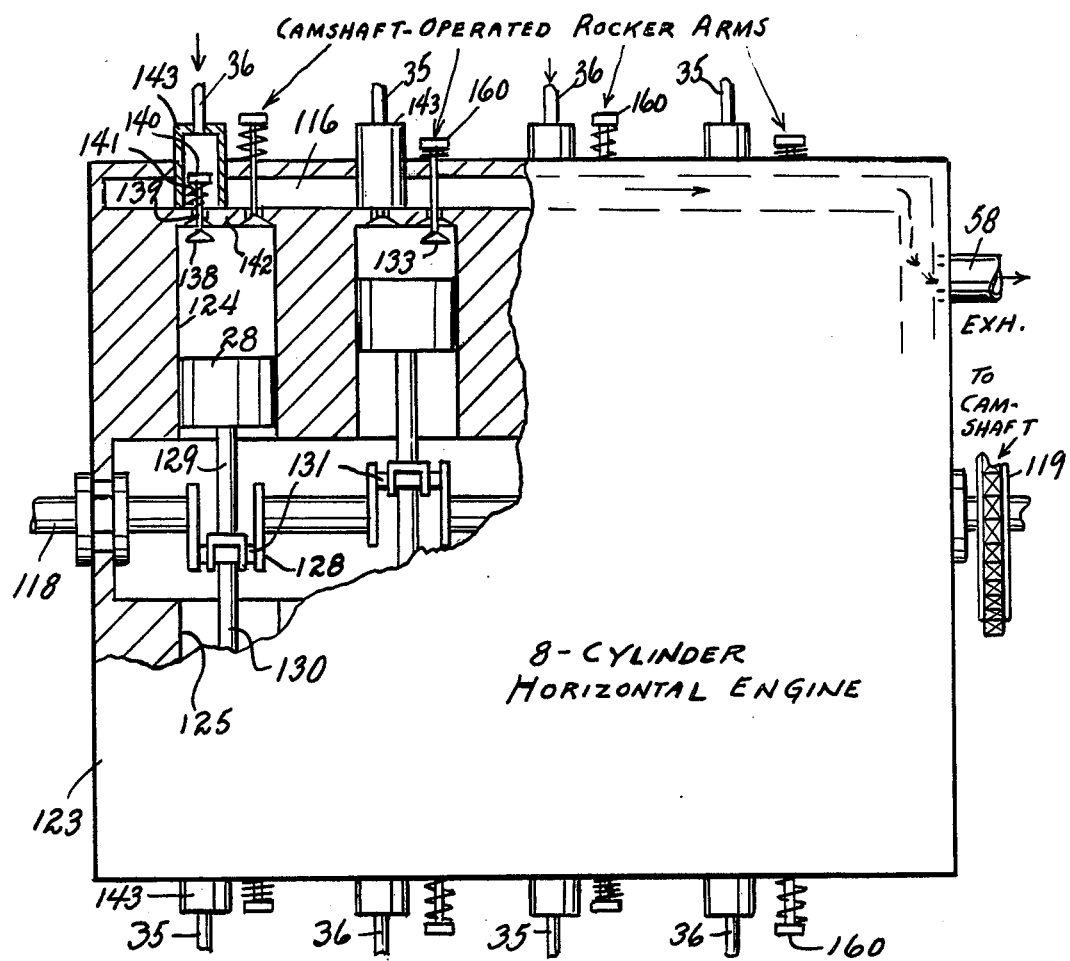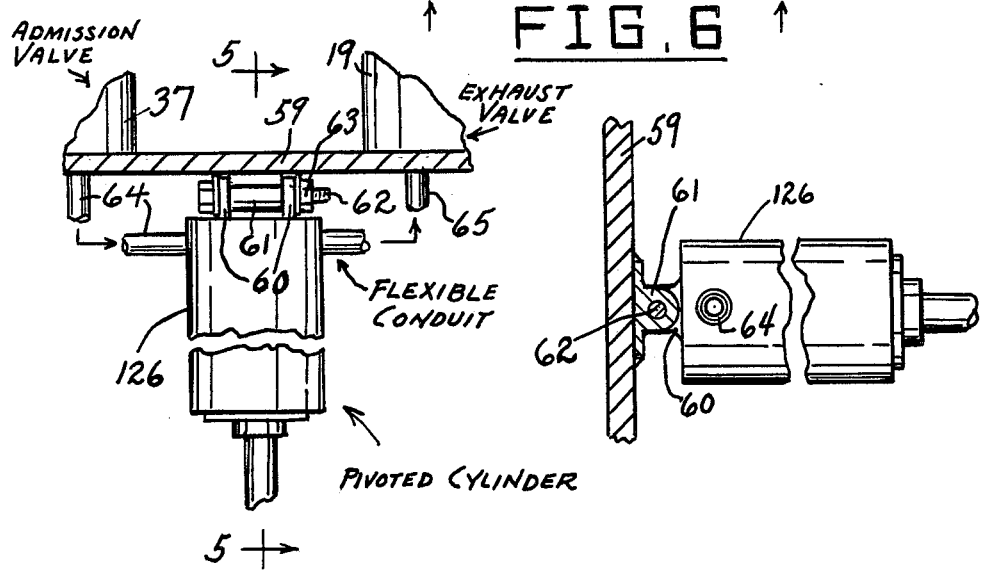

HYDRAULIC MOTOR WITH AIR DISTRIBUTOR-OPERATED VALVES

FIELD OF THE INVENTION

This invention relates to hydraulic engine systems, and more particularly to a hydraulic engine driven by compressed air.

BACKGROUND OF THE INVENTION

In the course of development of pollution-reducing engine systems for motor vehicles and for other power requirements, various systems have been proposed for driving the engines by the use of compressed air acting on hydraulic fluid. The compressed air is supplied from a readily rechargeable pressure tank and is applied to the working hydraulic fluid, which in turn is supplied to the engine cylinders through suitably timed admission valves to provide power strokes of the pistons, and on the return strokes the exhaust hydraulic fluid is returned to its reservoir for recirculation. The admission of the working fluid to the cylinders is usually controlled by a camshaft having individual cams acting on linkage systems operating respective pressure fluid intake valves for the cylinders. In engines having groups of cylinders which are alternately acted on by the working fluid it is uneconomical to employ camshafts with individual cam elements and associated valve-operating linkage systems, and the engines of this type usually involve a large number of heavy moving parts subject to frequent maladjustment and operational failure, are relatively cumbersome and noisy, and are inefficient in the utilization of the pressurized working fluid. Also, in the case of air-actuated hydraulic engines of the dynamically balanced type it is desirable to employ a more reliable arrangement for the synchronization of the timing of the power strokes of symmetrically-arranged cylinder groups in order to maintain a proper dynamic balance. Also, it is desirable to employ a more efficient arrangement for applying the pressurizing air to the hydraulic fluid for minimizing the air-recharging requirements and for insuring smooth circulation of the working hydraulic fluid.

Further background will be given by examining the following prior U.S. Pats. which appear to represent the closest prior art relating to the present invention, found in the course of a preliminary search:

| | |
|---|---|
| Murphy, | 4,018,050 |
| Beckett et al, | 3,507,189 |
| Brown, | 3,765,180 |
| Otto, | 3,779,132 |
| Shafer, | 3,024,809 |
| Shafer, | 2,915,042 |

SUMMARY OF THE INVENTION

Accordingly, an object of the invention is to overcome deficiencies in the prior art, such as are mentioned above.

Another object of the invention is to provide for engine powering in a manner causing reduced air pollution.

Another object of the invention is to provide a novel and improved pressurized hydraulic fluid motor system which may be employed for the propulsion of vehicles or for other power needs, the system being non-polluting to the atmosphere, being substantially free of fire and explosion hazards, being quiet and smooth in operation, requiring fewer and lighter moving parts as compared with previous systems proposed for similar functions, and having highly efficient valve means for admitting the working fluid to its cylinders.

A further object of the invention is to provide an improved arrangement for controlling the supply of pressurized hydraulic fluid to the cylinders of a hydraulic fluid engine, the control of the admission of the pressurized fluid being more positive and reliable than in previously proposed hydraulic fluid admission control systems, and the system of the present invention using a single cam instead of a camshaft with multiple fluid-admission cams.

A still further object of the invention is to provide an improved pressurized hydraulic fluid-operated multiple-cylinder engine suitable for driving a motor vehicle or for furnishing mechanical power for other purposes, the engine having improved dynamic balance, being relatively compact in size, and utilizing a simple and efficient relay air-operated valve arrangement in cooperation with a distributing cam to effect the timely admission of pressurized hydraulic fluid to the cylinders when pistons thereof are positioned for power strokes.

A still further object of the present invention is to provide an improved hydraulic engine system employing air pressure-responsive pilot valves to control the admission of pressurized hydraulic fluid to the engine cylinders, the pilot valves being operated by compressed air responsive to the alternate actuation of respective poppet valves by a single rotating cam directly driven by the crankshaft of the engine, so that accurate and positive timing of the engine power strokes is obtained without requiring the use of individual fluid admission cams for the respective cylinders.

BRIEF DESCRIPTION OF THE DRAWINGS

Further objects and advantages of the invention will become apparent from the following description and claims, and from the accompanying drawings, wherein:

FIG. 1 is a schematic diagram of a typical improved compressed air-driven hydraulic engine system constructed in accordance with the present invention.

FIG. 2 is an enlarged longitudinal cross-sectional view taken through one of the cam-actuated air distributing poppet valves employed in the air-driven hydraulic engine system of FIG. 1.

FIG. 3 is a fragmentary diagram of a modified form of hydraulic engine system according to the present invention, employing pivoted cylinders.

FIG. 4 is an enlarged fragmentary horizontal cross-sectional view taken through a portion of the engine of FIG. 3, showing a pivoted cylinder.

FIG. 5 is a vertical cross-sectional view taken substantially on the line 5—5 of FIG. 4.

FIG. 6 is a partial top plan view, partly in horizontal cross-section, of an eight-cylinder horizontal compressed air-driven hydraulic engine according to the present invention showing one piston at the end of its power stroke and an adjacent piston at the end of its exhaust stroke.

DESCRIPTION OF PREFERRED EMBODIMENTS

Referring to the drawings, FIG. 1 schematically illustrates the fluid circuit of a typical compressed air-driven hydraulic motor system according to the present invention. The fluid circuit comprises a hydraulic fluid storage tank 11 having a compressed air upper space 12 which is chargeable with compressed air, for example to a pressure of 300 psi, from a suitable external source through a control valve 13. Tank 11 is connected to a hydraulic fluid-driven engine 14 through a manually operated control valve 25, a conventional pressure regulator 15 and a distributing system, presently to be described, whereby to furnish hydraulic fluid at working pressure to the power-generating cylinders of the engine. As will be presently described, the pressurized hydraulic fluid is supplied to said engine cylinders through compressed air-controlled pilot valves 16, 17 which are timed to produce the power strokes of the engine pistons. At the ends of the power strokes the hydraulic fluid is exhausted from the cylinders via an exhaust line 58 to a reservoir tank 18 through timed exhaust valves 19, the opening of the exhaust valves being suitably timed by the action of a conventional camshaft assembly, not shown, driven by the crankshaft 20 of the engine though a suitable positive-drive transmission assembly 21. The engine may be of a type employing conventional rocker arms 22 and push rods, not shown, cooperating therewith to couple the camshaft assembly to the exhaust valves 19.

The reduced-pressure hydraulic fluid from the reservoir tank 18 is repressurized by a hydraulic pump 23 driven by crankshaft 20, for example to a pressure of 1000 psi, and the repressurized hydraulic fluid is returned to the main storage tank 11 through a conventional check valve 24. Tank 11 is provided with the manually operated outlet valve 25 to control the energization of the hyraulic engine 14.

The typical engine 14 has two symmetrically opposed pairs of cylinders 26,27 and 26', 27' arranged on opposite sides of the crankshaft 20 and having pistons 28,29 and 28',29' rotatably connected to crank assemblages 30,30' of the crankshaft by connecting rods 31,32 and 31',32'. As shown, the crank assemblages 30,30' are in 180° phase relationship so that the cylinders at each side of the engine are arranged to deliver power strokes in alternating sequence.

The pressurized hydraulic fluid supply lines, shown at 33,34, from the regulator 15 are connected through the respective normally closed conventional air pressure-responsive pilot valves 16,17 to conduits 35,36. The respective cylinders 26,27 have conventional spring-biased normally closed fluid admission valves, shown at 37. Conduit 36 is connected to the admission valves 37 associated with the pair of diagonally opposite cylinders 26,27', and conduit 35 is connected to the admission valves 37 associated with the other pair of diagonally opposite cylinders 26',27.

Pilot valve 16 is controlled by a first relay valve 38 and pilot valve 17 is controlled by a second relay valve 39. Relay valves 38,39 may be of the poppet type and are suitably mounted diametrically opposite each other with their plunger heads 40 in the path of movement of a projection 41 on the periphery of a cam disc 42 mounted on crankshaft 20. The control chamber of pilot valve 16 is connected to a compressed air conduit 43 leading from space 12, via conduit 44, poppet valve 38 and a conduit 45. The control chamber of pilot valve 17 is connected to air conduit 43 via a conduit 46, poppet valve 39 and a conduit 47.

The conduits 44,46 are normally vented to atmosphere, but, as shown in FIG. 2, when projection 41 abuts the plunger head 40 of the associated poppet valve 38 or 39, the associated valve stem 48 closes its vent passage 89 and connects its associated conduit 44 or 46 to its associated air supply conduit 45 or 47 via a reduced portion 50 of the stem 48 and chambers 51,52 of the poppet valve housing. For example, in FIG. 2 when head 40 is free, the biasing spring 53 elevates stem 48 to bring a stop collar 54 on stem 48 into abutment with the top wall 55 of the valve housing, sealing the bottom chamber 52 and connecting conduit 46 to the vent chamber 49. When head 40 is engaged by projection 41, as shown, conduit 46 is connected to conduit 47 via reduced stem portion 50.

In operation, when poppet valve 39 is opened by projection 41, as shown in FIG. 2, compressed air is supplied to the control chamber of pilot valve 17, admitting pressurized hydraulic fluid to conduit 36 and thence to cylinders 26,27' via their pressure-responsive admission valves 37. Pistons 28,29' deliver power strokes. At the same time, cylinders 27,26' exhaust hydraulic fluid to reservoir tank 18 via their exhaust valves 19. A similar action takes place 180° later when poppet valve 38 is opened by projection 41, whereby pistons 28', 29 deliver power strokes and cylinders 27', 26 are exhausted. Thus, power strokes will be sequentially generated by pistons 28,29' and pistons 28'29.

The axis of the crankshaft 20 is located so that it lies substantially at the axis of symmetry of the respective pairs of opposed cylinders, preferably in a common horizontal plane with the cylinders.

A generator 56 may be driven from crankshaft 20 through a suitable speed multiplier assembly 57, such as a suitable gearing arrangement, for furnishing electrical power for auxiliary equipment.

In starting the engine 14, valve 25 is opened and the crankshaft 20 is rotated, as by means of a conventional battery-operated starter motor, not shown. This causes the sequential opening of the poppet valves 38, 39 and allows pressurized hydraulic fluid to be delivered to the engine cylinders to develop power strokes in the manner above described, whereby to drive the engine.

FIGS. 3, 4 and 5 illustrate an alternative embodiment similar to that of FIG. 1, wherein the cylinders, shown at 126, 126', are pivoted to the longitudinal vertical walls of the engine housing on longitudinal axes parallel to crankshaft 20. Thus, as shown in FIGS. 4 and 5, each cylinder is hingedly pivoted to an adjacent longitudinal housing wall 59, the cylinder being provided at its outer end with a pair of spaced parallel apertured hinge lugs 60,60 which receive therebetween a hinge sleeve bracket 61 welded, or otherwise rigidly secured, to the adjacent vertical longitudinal wall 59. A hinge bolt 62 extends horizontally through the hinge lugs 60,60 and the intervening sleeve bracket 61, forming a hinge connection of the cylinder to the adjacent longitudinal housing wall. The bolt 62 is provided with a retaining nut 63.

The pivoted cylinders are provided with pistons having inwardly extending piston rods which are rotatably connected in a conventional manner to the crank elements 30,30' of crankshaft 20.

Pressure-responsive hydraulic fluid admission valve assemblies 37 are mounted on the vertical longitudinal walls 59 adjacent the respective pivoted cylinders and are communicatively connected to the outer ends of the cylinders by flexible conduits 64. Suitably timed pressurized hydraulic fluid is furnished to the admission valves in the same manner as described above in connection with the embodiment of FIG. 1.

Respective rocker arm-operated exhaust valve assemblies 19 are similarly mounted on the vertical longitudinal housing walls 59 adjacent the respective pivoted cylinders and are communicatively connected to the outer ends of the cylinders by flexible conduits 65. The exhaust valves 19 are operated by the rocker arms 22, which are in turn operated by a suitable camshaft assembly positively driven by crankshaft 20 in the same manner as in the previously described embodiment. The outlets of the exhaust valves 19 are connected to an exhaust line 58.

FIG. 6 illustrates a horizontal hydraulic fluid-driven engine similar to that of FIG. 1 but employing eight cylinders, namely, two assemblies similar to FIG. 1 arranged sequentially in an engine block 123. Said block is formed with four symmetrically opposed pairs of cylinders 124,125 arranged on opposite sides of a crankshaft 118 and having pistons 28 rotatably connected to crank assemblages 128 of the crankshaft by connecting rods 129,130. The opposing connecting rods 129,130 are suitably connected to the crank pins 131 for mutual relative rotation.

Exhaust valves 133 are provided in the end walls 142 of the respective cylinders. Also provided in valve seats formed in said end walls are hydraulic fluid admission valve elements 138 comprising generally frusto-conical members having valve stems 139 with abutment heads 140. Coiled springs 141 surround the stems and bear between the heads 140 and the outer surfaces of the cylinder end walls 142 and bias the conical valve members 138 into said valve seats. Generally cylindrical valve housings 143 are rigidly secured to the block 123, surrounding the valve stems 139 and projecting outwardly. Respective pressurized hydraulic fluid supply conduits 36 and 35 (timed as in FIG. 1) are communicatively connected to the outer ends of the housings 143. The conical valve members 138 open responsive to the admission of pressurized hydraulic fluid from the supply tank 11 in the manner described in connection with FIG. 1.

From FIG. 6 it will be seen that conduits 36 and 35 are in alternating relation at each side of the engine and are respectively connected to the valve housings 143 associated with opposing cylinders 124,125.

At the ends of the power strokes, the hydraulic fluid is exhausted from the cylinders past the timed exhaust valves 133, the opening of said exhaust valves being suitably timed in a conventional manner by the action of a camshaft assembly driven by the crankshaft 118 of the engine through a positive-drive transmission assembly 119. The engine may employ conventional rocker arms 160 and push rods, not shown, cooperating therewith and coupling the camshaft assembly to the exhaust valves 133. The exhaust hydraulic fluid flows through an exhaust manifold 116 to an exhaust conduit 58, being conveyed thereby to a reservoir tank for recirculation by a hydraulic pump in the manner described in connection with FIG. 1.

While specific embodiments of improved hydraulic motor systems have been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. In a hydraulic fluid engine system, a sealed liquid storage tank having a first space containing hydraulic liquid and a second space containing compressed air pressurizing said liquid, an engine provided with opposed cylinders containing pistons and a crankshaft having crank elements connected to said pistons, liquid conduit means connecting said first space of the storage tank to said cylinders and including respective compressed air-operated pilot valves for admitting pressurized liquid to said cylinders, and distributing air conduit means alternately operatively connecting said compressed air second space to said pilot valves responsive to rotation of the crankshaft.

2. The engine system of claim 1, and wherein said cylinders are substantially symmetrically arranged relative to said crankshaft.

3. The engine system of claim 1, and wherein said cylinders comprise two groups of cylinders with the cylinders of one group opposing the cylinders of the other group relative to said crankshaft.

4. The engine system of claim 1, and wherein said distributing air conduit means includes respective relay valves controlling the admission of compressed air to said pilot valves, and means on the crankshaft to sequentially open said relay valves responsive to rotation of the crankshaft.

5. The engine system of claim 4, and wherein the means to open said relay valves comprises cam means on the crankshaft sequentially operatively engageable with said relay valves responsive to said rotation of the crankshaft.

6. The engine system of claim 1, and wherein said cylinders comprise two groups arranged in opposition to each other relative to said crankshaft, each pilot valve controlling the admission of pressurized liquid to a respective group, and wherein said distributing air conduit means includes respective relay valves controlling the admission of compressed air to said pilot valves, and cam means on the crankshaft sequentially operatively engageable with said relay valves to alternately open said relay valves responsive to rotation of the crankshaft.

7. The engine system of claim 1, and wherein said distributing air conduit means includes poppet valves mounted on the engine, means to admit compressed air to the respective pilot valves responsive to the opening of said poppet valves, and cam means on the crankshaft having a projection sequentially operatively engageable with said poppet valves responsive to rotation of said crankshaft.

8. The engine system of claim 7, and wherein said poppet valves are mounted diametrically opposite each other.

9. The engine system of claim 1, and wherein the engine is provided with exhaust valve means in the respective cylinders, exhaust conduit means communicatively connected with said exhaust valve means, and means including recirculation pump means communicatively connecting said exhaust conduit means to said liquid storage tank.

10. The engine system of claim 1, and wherein said crankshaft is located substantially in a longitudinal vertical plane of symmetry of the engine.

11. The engine system of claim 10, and wherein said crankshaft and cylinders are arranged substantially in a common horizontal plane.

12. The engine system of claim 1, and means pivotally mounting said cylinders for rotation on axes substantially parallel to said crankshaft.

13. The engine system of claim 1, and wherein said cylinders are provided with spring-biased normally closed pressure-responsive admission valves opening responsive to the pressurized liquid delivered thereto.

14. The engine system of claim 1, and liquid return conduit means communicatively connecting said cylinders to said storage tank and including repressurizing pump means and check valve means between said pump means and said storage tank.

* * * * *